United States Patent Office 2,867,001
Patented Jan. 6, 1959

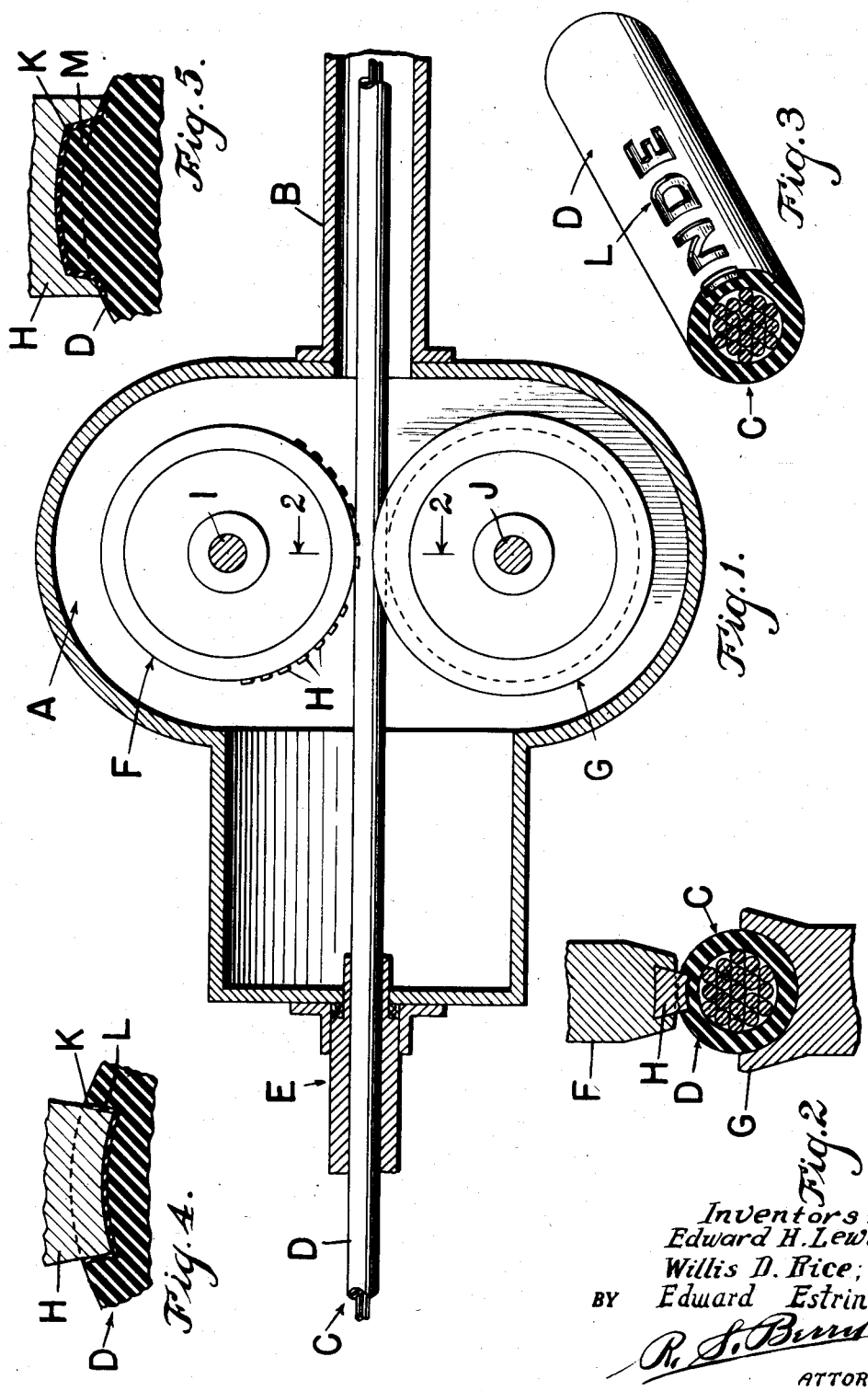

2,867,001

MEANS AND METHOD FOR FORMING INDICIA ON THE SURFACE OF CONTINUOUS VULCANIZED PRODUCTS

Edward H. Lewis, Los Angeles, Willis D. Rice, Monterey Park, and Edward Estrin, Los Angeles, Calif., assignors to Western Insulated Wire Co., a corporation of California Application December 3, 1954, Serial No. 472,804

7 Claims. (Cl. 18—6)

This invention relates to a means and method whereby indicia such as letters, numerals, symbols, insignia and the like may be formed on the surface of a continuous vulcanized product such as insulated electrical wires and cables, hose, tubing and like conduits produced with an extruded plastic cover formed of rubber or rubber-like vulcanizable material.

In the production of electrical wires or cables of the type in which metallic conductors are encased in insulating sheaths or jackets formed of vulcanized rubber or a rubber-like composition, and also in the production of hose, tubing and similar conduits encased in a vulcanized sheath, it has heretofore been the practice to produce indented or embossed indicia on the product by molding the indicia on the surface of the sheath in its plastic state before delivering it to a vulcanizer or by maintaining an embossed stencil on the sheath during vulcanization thereof. Both of these procedures are objectionable. In the case of molding indentations in the sheath before vulcanization as commonly practiced, the high fluid pressure to which the sheath is subsequently subjected in a vulcanizing chamber causes the displaced material of the indentations, which are ordinarily quite small, to swell and return to normal or nearly so, thereby marring and sometimes completely eliminating the indents.

In the case of molding raised or embossed indicia on the plastic sheath of a continuously extruded product it is necessary to apply a mold or stencil to the extrusion preliminary to delivery to a vulcanizing chamber in order to maintain the form of the indicia both in feeding the extrusion into the vulcanizer and during the vulcanizing operation.

In vulcanizing the sheath with retained molds or stencils thereon, wherein the displaced material is confined during vulcanization in the manner incident to molded rubber vulcanizing operations, such practice is commercially impractical in the production of extruded sheaths because the high speed of production precludes application and removal of the stencils and at best necessitates the provision and application of a multiplicity of stencils in order to enable frequent applications of the molded indicia along the length of the product.

The primary object of the present invention is to provide a means and method of producing indicia on the surface of vulcanized continuously extruded sheaths of electrical wires or cables, hose, tubing or like conduits, which is free of the objectionable features of the modes above recited, and which will enable the ready production of clear cut, well defined indented or raised indicia in frequent repetition on the surface of the rapidly extruded and vulcanized product.

Generally considered, the invention contemplates forming the indicia in the surface of the extended sheath or covering very shortly after it enters the vulcanizing atmosphere of a vulcanizing chamber and while the material of the sheath is plastic and unvulcanized, although preferably at about the time sheath surface vulcanizing commences.

The invention in its preferred form, further contemplates such indicia formation by means of a revoluble die heated to the requisite vulcanizing temperature so as to rapidly effect the compacting and surface vulcanization (or near surface vulcanization) of the indicia walls under die heat and pressure; and while all of the other sheath areas are subjected to the continuing vulcanizing action of said chamber atmosphere. Thus the indicia walls, due to the compacting and vulcanizing action of the die, will retain their defined shape following withdrawal of the latter and throughout subsequent complete vulcanization of the indicia-incorporating sheath.

The mechanism and mode of carrying the invention into effect is illustrated by way of example in the accompanying drawing, in which:

Fig. 1 is a diagram depicting the indicia forming and vulcanizing mechanism in section and elevation as applied to vulcanizing the insulative sheath of a cable:

Fig. 2 is a detail in section taken on the line 2—2 of Fig. 1 showing the indicia as indented in the sheath:

Fig. 3 is an isometric and sectional view of the indented product:

Fig. 4 is an exaggerated sectional view of a fragmentary portion of a sheath showing the manner in initially vulcanizing an indent in the sheath: and Fig. 5 is a sectional view of a fragmentary portion of a sheath showing the manner of initially vulcanizing the walls of raised or embossed indicia on a sheath.

Referring to the drawing more specifically A indicates a vulcanizing steam chamber of suitable construction containing an atmosphere of steam at the requisite vulcanizing temperature and pressure as is common in vulcanizing operations, and through which chamber and a connecting tube B is passed the conduit C embodying a covering or sheath D to be vulcanized and which conduit leads from an extruder E and is directed through the vulcanizer; the sheath D of the conduit C being initially formed of a polymer such as rubber or rubber-like material in a plastic state molded by and delivered from the extruder in such state all in the usual manner.

In carrying out the invention the sheathed conduit C shortly after entering the vulcanizing chamber is passed between the peripheries of a pair of contiguous metallic rollers at least one of which is fitted on its perimeter with dies H arranged and contoured to form desired indicia in or on the sheath D under pressure as the latter advances between the rollers as particularly shown in Fig. 2. The rollers F—G are carried on suitably supported shafts I—J and are positioned within the steam chamber in such proximity to the discharge end of the extruder E that the advancing extruded sheath D in its plastic state will be subjected to an outer body plasticity reducing and density increasing action by the vulcanizing steam in the chamber A as it travels from the extruder to the rollers. However, such pre-roller engagement exposure to the steam is of such short duration as not to effect material vulcanization of the surface of the sheath before the moment of its engagement by the die H whereby the dies will still readily displace the surface portion of the sheath to form indicia thereon. The pre-roller engagement steam treatment of sheath D therefore results in better roller die compacting of the body at the site of, and inwardly of, the indicia walls. This indicia may either be indented in the sheath as indicated at L in Figs. 3 and 4 or raised on the sheath as shown at M in Fig. 5.

Manifestly the dies H will be heated to the temperature of the chamber A by the absorption of heat therefrom and accordingly will be heated to a vulcanizing temperature. Thus on depressing or embossing indicia on the surface of the sheath under the pressure imposed by the dies, the vulcanizing and stabilizing of the walls of the indicia the pre-steam treated sheath D will rapidly take place as indicated at K whereby the indicia will be caused to retain their shape on withdrawal of the dies therefrom. This stabilizing of the walls of the indicia is further augmented by reason of the indicia being formed in the atmosphere of vulcanizing heat and pressure contained in the vucanizing chamber A.

It has been determined that highly satisfactory results are attained by applying the dies in effecting displacement of the sheath at an instant within one second after the extruded sheath D enters the steam chamber A. This die engagement is after the outer sheath body plasticity reducing and density-increasing action of the steam has taken place and is at the moment of commencement of the vulcanizing action on the surface of the sheath and before development of such action through the body of the sheath occurs which latter action ordinarily takes place in about five seconds. However the time required to effect complete vulcanization of the sheath is not material and obviously will vary under varying conditions. The important feature of the invention is the application of the revolving heated die under pressure to the advancing extruded cable sheath D at a point in the vulcanizing chamber where the sheath is still plastic or unvulcanized so that the dies will readily mold indicia on the sheath and at the same time because of the heat and pressure of the die the walls of the indicia will be sustained against distortion on withdrawal of the dies therefrom and throughout the subsequent vulcanizing operation, and whereby sharp, well defined indicia will be formed on the vulcanized product as indicated at M in Fig. 3.

In the operation of the mechanism, the conduit C to be vulcanized, be it a sheathed wire or cable, hose or tubing is advanced through the extruder E and vulcanizing chamber A in the usual manner, while the rollers F—G are rotated by frictional engagement therewith of the sheath; one of the rollers being grooved to snugly conform to the sheath as shown in Fig. 2.

We claim:

1. The method consisting in continuously feeding into and through a vulcanizing atmosphere a length of conduit having a sheath formed of extruded plastic vulcanizable material, and after a minor period of exposure of the conduit sheath to said atmosphere as compared to the period required for sheath vulcanization and not earlier than about the moment sheath surface vulcanization commences, the step of simultaneously molding and pre-vulcanizing indicia of substantial thickness on said sheath while in such atmosphere under applied heat and pressure and while the other sheath areas are undergoing the surface vulcanizing action of said atmosphere, and said minor period of sheath exposure to said atmosphere reducing exterior sheath body elasticity and increasing its density at such area so as to result in better compacting of the sheath body at and inwardly of the walls of indicia formed therein.

2. The method consisting in continuously feeding into and through a vulcanizing atmosphere a length of conduit having a sheath formed of extruded vulcanizable material in a plastic state and after a minor period of exposure of the conduit sheath to said atmosphere as compared to the period required for sheath vulcanization and not earlier than about the moment sheet surface vulcanization commences, the step of molding indicia of substantial thickness on said sheath under pressure while the material is in its plastic state by dies heated to a vulcanizing temperature to thereby surface-vulcanize the walls of the molded indicia while the other sheath areas are undergoing the surface-vulcanizing action of said atmosphere, whereby the latter will retain their defined contours during subsequent vulcanization of said sheath.

3. The method of forming indicia on the surface of a vulcanizable sheath of a continuous product consisting in extruding the sheath in a plastic state into an atmosphere of vulcanizing heat and pressure, and after a minor period of exposure of the conduit sheath to said atmosphere as compared to the period required to sheath vulcanization and not earlier than about the moment sheet surface vulcanization commences, the step of molding indicia of substantial thickness on the surface of the sheath under pressure while the sheath is in such atmosphere and while in its plastic state by means of a die heated to a vulcanizing temperature, and thereafter completely vulcanizing the sheath throughout.

4. The method of forming indicia on the surface of a sheath of a continuous product consisting in extruding the sheath in a plastic state into an atmosphere of vulcanizing heat and pressure, and after a minor period of exposure of the conduit sheath to said atmosphere as compared to the period required for sheath vulcanization and not earlier than about the moment sheet surface vulcanization commences, the step of molding indicia of substantial thickness on the surface of the sheath while in such atmosphere and while in its plastic state by means of a die heated to a vulcanizing temperature by heat absorbed from such atmosphere, and thereafter completely vulcanizing the sheath throughout.

5. In a mechanism for vulcanizing sheaths on continuous conduits, the combination of a walled vulcanizing chamber, having a conduit entry and exit in opposite walls, an extruder for molding a plastic sheath on a continuous conduit and directing the assemblage through said chamber, and a metallic die arranged in said chamber engageable with said sheath to mold indicia on the surface thereof as the assemblage advances through said chamber, said die being spaced from the conduit entry such a distance that outer sheath body plasticity will be decreased and its density increased by vulcanizing chamber action but without actual vulcanization taking place prior to action of the die, whereby better die-produced compacting of the sheath body at the site of and inwardly of the indicia walls will be effected.

6. In a mechanism for vulcanizing indicia on the sheaths of conduits, the combination of a walled vulcanizing chamber having a conduit entry and exit in opposite walls, an extruder for molding a plastic sheath on a conduit and directing the assemblage through said chamber, and metallic rolling indenting die arranged in said chamber engageable with said sheath to form indicia on the surface thereof under heat and pressure as the assemblage is advanced through said chamber, and said indenting die being spaced from the conduit entry such a distance that outer sheath body plasticity will be decreased and its density increased by vulcanizing chamber action but without actual vulcanization taking place prior to action of the die, whereby better die-produced compacting of the sheath body at the site of and inwardly of the indicia walls will be effected.

7. In the production of indicia on the surface of continuous longitudinally traveling vulcanized products wherein the indicia is characterized by being defined by side walls and wherein the product is initially formed with an extruded sheath of a vulcanizable polymer in a plastic state which is subsequently subjected to vulcanizing temperature and pressure in vulcanizing atmosphere to thereby render it stable, the indicia-producing method which consists in subjecting the traveling sheath to an outer body area plasticity-reducing and density-increasing action of said atmosphere for a period of time less than that required to start exterior surface vulcanization, and then molding the indicia on the extruded plastic sheath immediately before vulcanization of the material in toto, by application to the plastic sheath under pressure of a mold bearing the indicia heated to a vulcanizing temperature whereby the surfaces of the walls of the initially molded indicia will be compacted and vulcanized so as to be sustained against distortion and be maintained sharp and well defined during subsequent vulcanization of the sheath.

References Cited in the file of this patent

UNITED STATES PATENTS

| | | |
|---|---|---|
| 1,380,426 | Seward | June 7, 1921 |
| 1,394,928 | Midgley et al. | Oct. 25, 1921 |
| 1,440,007 | Freeman et al. | Dec. 26, 1922 |
| 1,956,575 | Hinsky | May 1, 1934 |
| 2,119,570 | Brillhart | June 7, 1938 |
| 2,608,718 | Berggren | Sept. 2, 1952 |